Patented May 26, 1936

2,042,130

UNITED STATES PATENT OFFICE 2,042,130

BOILER CLEANING COMPOSITION

Edward Lewis Smead, Mexico, D. F., Mexico, assignor to Henex, S. A., Mexico, D. F., Mexico No Drawing. Application May 2, 1935, Serial No. 19,535. In Mexico November 30, 1932

5 Claims. (Cl. 87—27)

The present invention forms a continuation in part of my copending application Serial No. 669,604 for Product for cleaning in general, filed May 5, 1933, which has matured into Patent No. 2,012,641, August 27, 1935 and relates to a boiler cleaning composition.

Today the henequen plant which is found in various parts of Mexico, is used for the purpose of obtaining one main product, that is, fiber, and two by-products, that is, pulp and juice. Having made an effort to find a use for either or both of these by-products, I have experimented with juice and found that certain concentrates thereof attack rust and scale with great efficiency and it is this concentrate of the juice of the henequen plant which constitutes the new and useful industrial product referred to in this invention.

The juice of the henequen plant may be obtained through any of several known and ordinary means, that is, by scraping, which has for its principal object the extraction of the fiber but which also separates the juice; or it may be obtained by compressing or crushing. The juice obtained in this manner is then reduced to a concentrate which I have found to be useful in the manner specified and which constitutes the principal ingredient of my invention. The means used to obtain the concentrate do not constitute an important part of the procedure of the manufacture of the product notwithstanding the fact that my experiments have shown that the most practical method is by boiling the raw juice.

I have found that concentrates of two to one, three to one, four to one and five to one produce magnificent results and each of the concentrates mentioned above will have its especial use.

The product as described above is susceptible of fermentation and the consequent danger produced by such reaction. Naturally, it was impossible to introduce to the industrial world a fermenting product and therefore I conducted numerous experiments with a view to encountering an agent which would impede fermentation. As a result of these experiments I have discovered that, for instance, the use of carbolic acid or of formaldehyde in the proportion of one gram per liter of the henequen juice has great efficiency and completely prohibits fermentation. The scope of this invention is however not limited to the use of carbolic acid or in this instance of formaldehyde to prohibit fermentation. The new industrial cleaning product which I have perfected must be a nonfermenting product and the object of this invention is to provide a product of that nature. Consequently, I may use any other chemical agent which prohibits fermentation in a proportion other than that mentioned with regard to carbolic acid or formaldehyde, such for instance as sodium benzoate, salicylic acid and borax in substantially the same proportion as given above.

It should be understood that the invention is not limited to the composition of the product and the proportions given, but may be varied widely without departing from the spirit of the invention as defined by the claims.

I claim:

1. A boiler cleaning composition consisting of the juice of henequen plant reduced to a concentrate ranging between 2 to 1 and 5 to 1, mixed with a preservative completely prohibiting fermentation of said juice, the said preservative being selected from the group consisting of sodium benzoate, salicylic acid, borax and formaldehyde.

2. A boiler cleaning composition consisting of a combination of a concentrate of the juice of henequen plant with formaldehyde for preventing fermentation of the juice, the concentration of the juice ranging between 2 to 1 and 5 to 1.

3. A boiler cleaning composition consisting of the juice of henequen plant reduced to a concentrate ranging between 2 to 1 and 5 to 1, mixed with formaldehyde as a preservative for the juice in the approximate proportion of 1 gram of formaldehyde to 1 liter of the concentrated juice.

4. A boiler cleaning composition consisting of the juice of henequen plant reduced to a concentrate ranging between 2 to 1 and 5 to 1, mixed with sodium benzoate as a preservative for the juice in the approximate proportion of 1 gram of sodium benzoate to 1 liter of the concentrated juice.

5. A boiler cleaning composition consisting of the juice of henequen plant reduced to a concentrate ranging between 2 to 1 and 5 to 1, mixed with salicylic acid as a preservative for the juice in the approximate proportion of 1 gram of salicylic acid to 1 liter of the concentrated juice.

EDWARD LEWIS SMEAD.